United States Patent [19]

Veigl

[11] Patent Number: 4,982,304

[45] Date of Patent: Jan. 1, 1991

[54] MODE CHANGING MECHANISM FOR RECORDING AND REPRODUCING APPARATUS

[75] Inventor: Johann Veigl, Vienna, Austria

[73] Assignee: U.S. Philips Corporation, New York, N.Y.

[21] Appl. No.: 385,612

[22] Filed: Jul. 26, 1989

[30] Foreign Application Priority Data

Aug. 10, 1988 [AT] Austria ................................ 2009/88

[51] Int. Cl.⁵ ............................................ G11B 21/22
[52] U.S. Cl. ...................................... 360/137; 360/105
[58] Field of Search ...................... 360/137, 96.1, 105

[56] References Cited

U.S. PATENT DOCUMENTS

| | | | |
|---|---|---|---|
| 4,194,229 | 3/1980 | Yamamoto et al. | |
| 4,554,601 | 11/1985 | Sugihara | 360/137 X |
| 4,626,937 | 12/1986 | Hutterer | 360/137 X |

*Primary Examiner*—A. J. Heinz
*Attorney, Agent, or Firm*—Bernard Tiegerman

[57] ABSTRACT

For switching on an operating mode "playback, normal forward running", a recording and reproducing apparatus (1) for a drivable record carrier (3) has a playback servomechanism (29) which can be triggered by a playback button (23) and for switching on an operating mode "record, normal forward running" it has a record servomechanism (29') which can be triggered by a record button (24). Both servomechanisms (29, 29') have a driving component (39, 39'), a driven component (40, 40'), which can be brought into engagement with the driving part (39, 39'), for displacing at least one apparatus component (15, 16, 17, 18, 20, 22) and a blocking component (49, 49') which can be displaced by the relevant button (23, 24) from a blocking position into a release position. Between the record button (24) and the blocking component (49) of the playback servomechanism (29) there is provided a coupling arrangement (62) via which, upon actuation of the record button (24), the blocking component (49) of the playback servomechanism (29) can be displaced. As a result, when the record button (24) is actuated both the record servomechanism (29') and the playback servomechanism (29) are triggered (FIG. 4).

3 Claims, 2 Drawing Sheets

MODE CHANGING MECHANISM FOR RECORDING AND REPRODUCING APPARATUS

The invention relates to a recording and reproducing apparatus for a drivable record carrier having a button for switching on an operating mode "playback, normal forward running" and having a button for switching on an operating mode "record, normal forward running" and having two servomechanisms which are each associated with one of the two buttons, are provided for carrying out the switching on of the operating modes and each have a motor-drivable driving component, a driven component which can be brought into engagement with the driving component for the purpose of displacing at least one apparatus component and a blocking component which can be displaced upon actuation of the relevant button from a blocking position into a release position and, in its blocking position, holds the driven component out of engagement with the driving component and, in its release position, releases the driven component for bringing into engagement with the driving component, for carrying out the switching on of the operating mode "playback, normal forward running" at least one apparatus component required for this operating mode being displaced and for carrying out the switching on of the operating mode "record, normal forward running" the apparatus component required for the operating mode "playback, normal forward running" and additionally at least one further apparatus component required for the operating mode "record, normal forward running" being displaced.

A recording and reproducing apparatus of this kind is known, for example, from German Pat. No. 2,839,660, this being an apparatus for recording audio signals onto and reproducing audio signals from a magnetizable, drivable record carrier in tape form, referred to for short as magnetic tape. In the case of such an apparatus, for carrying out the switching on of the operating mode "playback, normal forward running", in which audio signals recorded on a magnetic tape are reproduced, a plurality of apparatus components required for this operating mode are displaced, e.g. a carrier plate bearing the magnetic heads for scanning the magnetic tape and a pinch roller for pressing the magnetic tape against a capstan, a driving wheel, mounted rotatably on a displaceable carrier, for driving a turntable and, if appropriate, turntable brakes. For carrying out the switching on of the operating mode "record, normal forward running", in which audio signals are recorded on a magnetic tape, the apparatus components required for the operating mode "playback, normal forward running" and, in addition, at least one further apparatus component required for the operating mode "record, normal forward running", such as for example an electrical recording switch, are displaced. In the case of the known apparatus, the displacement of the apparatus components required for the two operating modes mentioned is effected as follows: the apparatus components required for the operating mode "playback, normal forward running" are displaced by the driven component of the servomechanism associated with the button for switching on the operating mode "playback, normal forward running", the blocking component of said servomechanism being displaceable into its release position during this procedure only by the button for switching on the operating mode "playback, normal forward running", and both the apparatus components also required for the operating mode "playback, normal forward running" and, in addition, the further apparatus component required for the operating mode "record, normal forward running", there being at least one such component, are displaced by the driven component of the servomechanism associated with the button for switching on the operating mode "record, normal forward running", the blocking component of said servomechanism being displaceable into its release position during this procedure only by the button for switching on the operating mode "record, normal forward running", so that all apparatus components required for carrying out the operating mode "record, normal forward running" are displaced solely by the servomechanism associated with the button for switching on the operating mode "record, normal forward running". Since both the apparatus components also required for the operating mode "playback, normal forward running" and, in addition, the further apparatus component required for the operating mode "record, normal forward running", there being at least one such component, are displaced via the servomechanism associated with the button for switching on the operating mode "record, normal forward running", a relatively complicated displacement mechanism which takes up a relatively large amount of space and is designed to transmit relatively large forces is required between the driven component of this servomechanism and the apparatus components to be displaced as a whole by the latter, and this is unfavourable with regard to an apparatus design which is as simple, operationally reliable and space-saving as possible.

The object on which the invention is based is to avoid the difficulties listed above and to design an apparatus of the generic type stated at the outset in such a way that an apparatus design which is as simple, operationally reliable and space-saving as possible is obtained. For this purpose, the invention is characterized in that a coupling arrangement, via which, upon actuation of the button for switching on the operating mode "record, normal forward running", the blocking component of the servomechanism associated with the button for switching on the operating mode "playback, normal forward running" can be displaced from its blocking position into its release position, is provided between the button for switching on the operating mode "record, normal forward running" and the blocking component of the servomechanism associated with the button for switching on the operating mode "playback, normal forward running". It is thereby achieved in a simple manner that, upon actuation of the button for switching on the operating mode "record, normal forward running", both the blocking component of the servomechanism associated with the button for switching on the operating mode "record, normal forward running" and the blocking component of the servomechanism associated with the button for switching on the operating mode "playback, normal forward running" are displaced into their release positions, with the result that both servomechanisms are set in motion. It is thereby achieved that the displacement of the apparatus components required for carrying out the switching on of the operating mode "record, normal forward running" is not effected by one single servomechanism only but is divided between two servomechanisms. Here, for the purpose of carrying out the switching on of the operating mode "record, normal forward running" the apparatus component required for the operating mode "playback, normal forward running", there being at least one such component, is displaced by means of the servomechanism associated with the button for switching on this operating mode and, in addition, only the further apparatus component required for the operating mode "record, normal forward running", there being at least one such component, is displaced by means of the servomechanism associated with the button for switching on this operating mode. It is thereby achieved that a displacement mechanism which is simple, space-saving and designed to transmit only small forces is sufficient between the driven component of the servomechanism associated with the button for switching on the operating mode "record, normal forward running" and the further apparatus component which can be displaced by the said servomechanism, there being at least one such component, and this is advantageous with regard to a simple, inexpensive, operationally reliable and space-saving design of the apparatus.

The coupling arrangement can be formed, for example, by a lever mechanism comprising a plurality of levers. However, it has proven particularly advantageous if the coupling arrangement is formed by an arm which is connected integrally to the blocking component of the servomechanism associated with the button for switching on the operating mode "playback, normal forward running", which projects from said servomechanism and the free end of which can be displaced by the button for switching on the operating mode "record, normal forward running". In this way, a particularly simple design for the coupling arrangement is achieved.

The free end of the arm forming the coupling arrangement can, for example, be displaced directly by the button for switching on the operating mode "record, normal forward running". However, it has proven particularly advantageous if the free end of the arm forming the coupling arrangement protrudes into the displacement path of the blocking component of the servomechanism associated with the button for switching on the operating mode "record, normal forward running" and is displaced by this blocking component when this button is actuated. This is advantageous in view of the fact that both servomechanisms are reliably set in motion for carrying out the switching on of the operating mode "record, normal forward running".

The invention is explained in greater detail below with reference to an exemplary embodiment which is illustrated in the drawings, to which, however, the invention is not restricted.

FIG. 1 shows schematically, in plan view and on a reduced scale compared to actual size, a recording and reproducing apparatus for a drivable record carrier in tape form accommodated in a cassette, said apparatus having a set of buttons for switching on operating modes of the apparatus comprising a button for switching on an operating mode "playback, normal forward running" and a button for switching on an operating mode "record, normal forward running".

Figure 1:
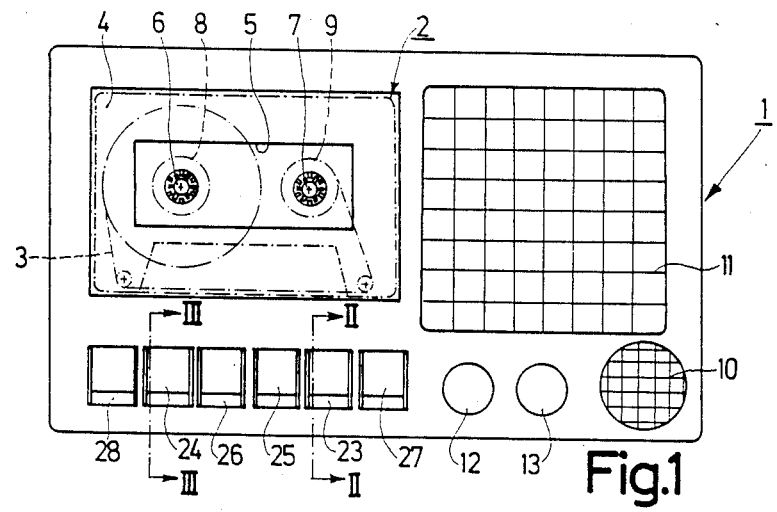

FIG. 1 shows a recording and reproducing apparatus 1 for a magnetizable, drivable record carrier 3 in tape form which is accommodated in a cassette 2 and is referred to for short below as magnetic tape. In FIG. 1, the cassette 2 and the magnetic tape 3 are illustrated schematically using dash-dotted lines. Audio signals can be recorded onto and reproduced again from the magnetic tape 3. The cassette 2 is inserted into a compartment of the apparatus 1 which can be closed by means of a pivotable cover 4. The cover 4 has a window 5. Two winding spindles of the apparatus, namely a feed spindle 6 and a take-up spindle 7, can be seen through the window 5, said spindles serving to drive the magnetic tape 3 and being in drive connection with two hubs 8 and 9 accommodated in the cassette. The magnetic tape 3 can be wound onto the two hubs in accordance with its direction of movement. The apparatus 1 furthermore has a lattice-like covering 10 behind which is arranged a microphone, built into the apparatus, for recording audio signals, and a further lattice-like covering 11 behind which is arranged a loudspeaker, built into the apparatus, for reproducing audio signals. The apparatus 1 furthermore has two rotary controls 12 and 13, by means of which the volume and frequency response of the audio signals to be reproduced by the loudspeaker can be controlled.

Figure 4:
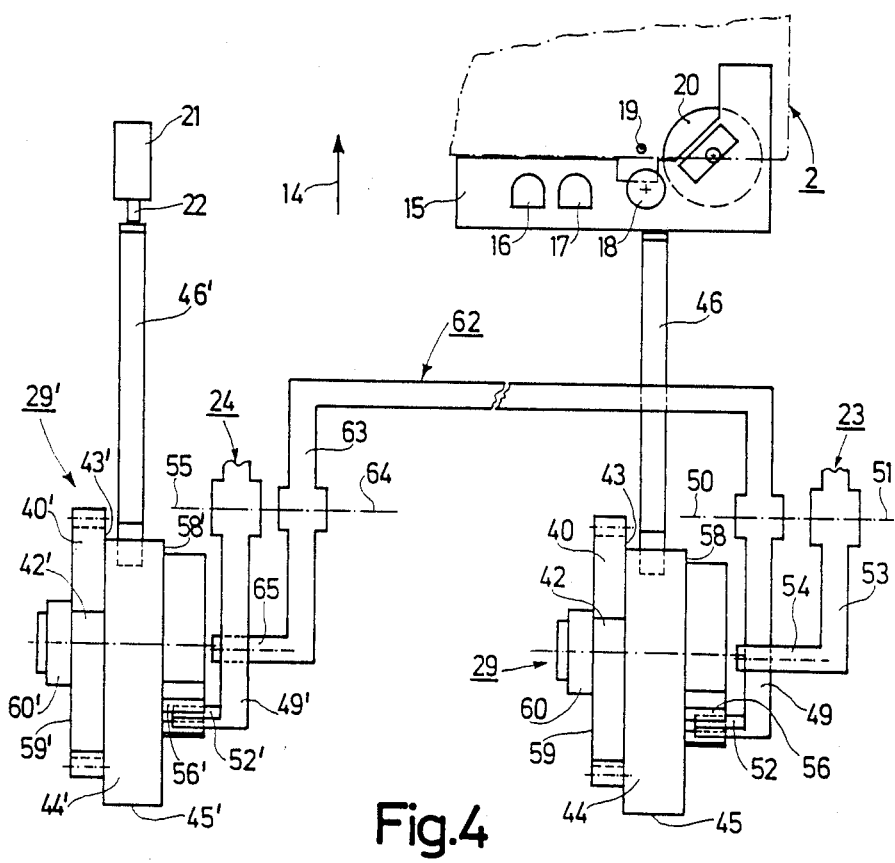
FIG. 4 shows, in each case partially, in schematic form and in plan view, the two servomechanisms according to FIGS. 2 and 3 and the apparatus components which can be displaced by the two servomechanisms.

As illustrated schematically in FIG. 4, the apparatus 1 has a carrier plate 15 which can be displaced in the direction of an arrow 14 towards the cassette 2. On the carrier plate 15 are provided a magnetic erase head 16 for erasing audio signals recorded on the magnetic tape 3, a magnetic recording/reproducing head 17 for recording audio signals onto the magnetic tape and for reproducing audio signals from the magnetic tape and a rotatably mounted pinch roller 18, held swivellably on the carrier plate 15, for pressing the magnetic tape against a rotatingly drivable capstan 19 for driving the magnetic tape during recording and reproducing. For driving the take-up spindle 7 during recording and reproducing, the apparatus 1 has a displaceably mounted, rotatingly drivable driving wheel 20, whose displacement is controlled by the carrier plate 15. The apparatus 1 furthermore has an electric recording switch 21, which is designed as a slide switch and must be actuated in order to record audio signals. Upon actuation of this recording switch 21, its switching slide 22 being displaced, it switches a recording/reproducing amplifier circuit from an operating function appropriate to the reproduction of audio signals to an operating function appropriate to the recording of audio signals. Since such an apparatus design with a carrier plate for carrying magnetic heads and a pinch roller and for controlling a driving wheel for a take-up spindle and with a recording switch has long been universally known, a detailed illustration of this has been omitted.

For reproducing audio signals, an operating mode "playback, normal forward running" can be switched on in the apparatus 1. For carrying out the switching on of this operating mode, the carrier plate 15 is displaced towards the cassette 2, the magnetic heads 16 and 17 then moving into contact with the magnetic tape 3 and the pinch roller 18 pressing the magnetic tape 3 against the capstan 19 and the driving wheel 20 being displaced into an operating position in which the take-up spindle 7 can be driven via the driving wheel 20. For recording audio signals, an operating mode "record, normal forward running" can be switched on in the apparatus 1. For carrying out the switching on of this operating mode, the recording switch 21 is also actuated in addition to the carrier plate 15 by displacing its switching slide 22, the recording/reproducing amplifier circuit then being switched over into its operating function appropriate to the recording of audio signals. For rapid winding of the magnetic tape 3 between the two hubs 8 and 9, an operating mode "fast forward" and an operating mode "fast rewind" can furthermore be switched on in the apparatus 1. For easy interruption of a recording or reproducing operation, an operating mode "pause" can furthermore be switched on in the apparatus 1. In order to switch off all the abovementioned operating modes, an operating mode "stop" can be switched on in the apparatus 1.

As can be seen from FIG. 1, for switching on the abovementioned operating modes the apparatus 1 has six pushbuttons, which are designated by the reference numerals 23, 24, 25, 26, 27 and 28. Pushbutton 23 serves for switching on the operating mode "playback, normal forward running", pushbutton 24 for switching on the operating mode "record, normal forward running", pushbutton 25 for switching on the operating mode "fast forward", pushbutton 26 for switching on the operating mode "fast rewind", pushbutton 27 for switching on the operating mode "pause" and pushbutton 28 for switching on the operating mode "stop".

Figure 3:
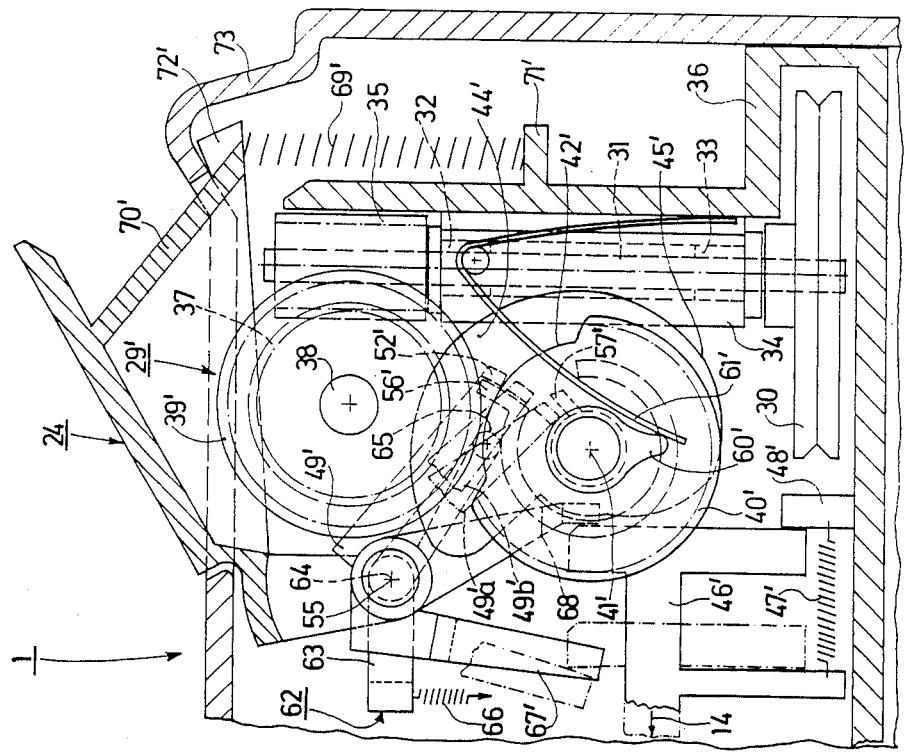
FIG. 3 shows, analogously to FIG. 2, in a section in accordance with the line III—III in FIG. 1, a servomechanism for carrying out the switching on of the operating mode "record, normal forward running", which is associated with the button for switching on the operating mode "record, normal forward running" and can be triggered by this button.
Figure 2:
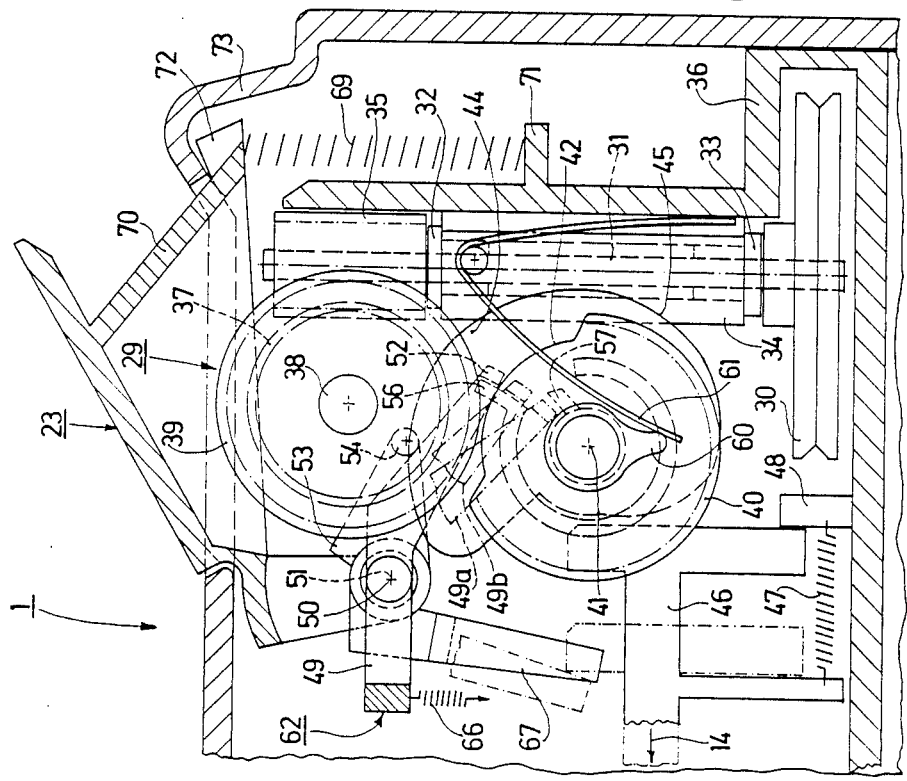
FIG. 2 shows, in a section in accordance with the line II—II in FIG. 1 and on a larger scale than FIG. 1, a servomechanism for carrying out the switching on of the operating mode "playback, normal forward running", which is associated with the button for switching on the operating mode "playback, normal forward running" and can be triggered by this button.

In the present apparatus, for carrying out the switching on of the abovementioned operating modes each of the six pushbuttons 23 to 28 has associated with it a servomechanism which is set in motion or triggered when the relevant pushbutton is actuated, this requiring only a small actuating force for the pushbutton to be actuated in the particular case, and which supplies the displacement forces in order to displace the apparatus components which are required for the desired operating mode to be switched on. Of the six servomechanisms of the apparatus, which all have essentially the same design, FIG. 2 illustrates the servomechanism associated with the pushbutton 23 for switching on the operating mode "playback, normal forward running" and FIG. 3 illustrates the servomechanism associated with the pushbutton 24 for switching on the operating mode "record, normal forward running". Since the two servomechanisms have an almost identical structure, they and their components are designated using the same reference numerals, the reference numerals relating to the servomechanism 24 associated with the pushbutton for switching on the operating mode "record, normal forward running" being additionally provided with an apostrophe.

For driving the servomechanisms 29 and 29' a belt pulley 30 is provided which can be driven by a motor (not shown) via a driving belt and is mounted on a shaft 31 which is rotatably mounted in a sleeve 34 by means of two porous bearings 32 and 33 and on whose end facing away from the belt pulley 30 a worm 35 is secured fixedly in terms of rotation. The sleeve 34 is formed integrally with a chassis 36 consisting of plastic. The worm 35 is in engagement with a worm wheel 37 which is seated on a shaft 38 which extends along all six pushbuttons 23 to 28.

As motor-drivable driving component, each of the six servomechanisms of the apparatus 1 has a gear secured fixedly in terms of rotation on the shaft 38. Of these gears, those gears which belong to the servomechanisms 29 and 29' are designated by the reference numerals 39 and 39'. Each servomechanism 29, 29' furthermore has a gear 40, 40' provided as driven component, which can be brought into engagement with the gear 39, 39'. The gears 40, 40' can be rotated about mutually aligned axes 41, 41' and have a toothless region 42, 42' which lies opposite the gear 39, 39, when the servomechanism 29, 29' has not been triggered. The gear 40, 40' serves to displace the apparatus components to be displaced by means of the servomechanism 29, 29'. For this purpose, a displacement plate 44, 44' whose peripheral surface 45, 45' has a partially spiral-shaped course is connected to one side face 43, 43' of the gear 40, 40'. By means of this peripheral surface 45, 45, a simple slide 46, 46' can in each case be displaced in the direction of the arrow 14, counter to the force of a restoring spring 47, 47' acting on the slide 46, 46', out of a rest position illustrated in FIGS. 2 and 3 by solid lines, in which the slide 46, 46' is supported on a stop 48, 48' projecting from the chassis 36, into an operating position, illustrated by dash-dotted lines in FIGS. 2 and 3, in which the slides 46, 46' are held releasably by a locking rail (not shown) which is displaceable transversely to the slides. The locking rail can be displaced by means of the servomechanism associated with the pushbutton 28 for switching on the operating mode "stop" into a release position in which it again releases a slide 46, 46' held by it with engagement, so that said slide is displaced back into its rest position under the action of the restoring spring 47, 47'. As can be seen from FIG. 4, the carrier plate 15 can be displaced in the direction of the arrow 14 together with the slide 46 and the switching slide 22 of the recording switch 21 can be displaced in the direction of the arrow 14 together with the slide 46'.

Each servomechanism 29, 29' furthermore has a blocking component 49, 49' which can be displaced upon actuation of the relevant pushbutton 23, 24 triggering this servomechanism 29, 29' from a blocking position into a release position. The blocking component 49 of the servomechanism 29 is formed by a pivotable lever whose pivoting axis 50 is line with the pivoting axis 51 of the pushbutton 23 and at its free end has a prolongation 52 projecting transversely from it. For the displacement of the blocking component 49 upon actuation of the pushbutton 23 for switching on the operating mode "playback, normal forward running", this pushbutton 23 is connected integrally to an arm 53 which at its free end has a pin 54 projecting transversely from it which serves for displacing the blocking component 49. The blocking component 49' of the servomechanism 29' is formed by an arm which is connected integrally to the pushbutton 24 for switching on the operating mode "record, normal forward running", pivotable about a pivoting axis 55, and which at its free end has a prolongation 52' projecting transversely from it. The prolongations 52, 52' of the blocking components 49, 49' cooperate with in each case two blocking stops 56, 57, 56', 57' which are provided on that side face 58, 58' of the displacement plate 44, 44' which faces away from the gear 40, 40'. In FIGS. 2 and 3, the blocking components 49, 49' are illustrated in their blocking positions using solid lines. The blocking components are furthermore illustrated in their release positions and in their working positions, in which they likewise exercise a blocking function, explained in further detail below, using dash-dotted lines. In the blocking position, the blocking components 49, 49' hold the gears 40, 40' out of engagement with the gears 39, 39' on the shaft 38. In the release position, the blocking components 49, 49' release the gears 40, 40' for bringing into engagement with the gears 39, 39'.

For setting in motion or triggering the servomechanisms 29, 29', a releasing cam 60, 60' is provided on that side face 59, 59' of each gear 40, 40' which faces away from the displacement plate 44, 44', on which releasing cam there acts a leg spring 61, 61' which is supported on the chassis 36 and attempts to rotate the releasing cam 60, 60' and consequently the gear 40, 40' in the clockwise direction according to FIGS. 2 and 3 in order to bring the gear 40, 40' into engagement with the gear 39, 39'.

As can be ascertained from FIGS. 2, 3 and, in particular, 4, a coupling arrangement 62 is now provided between the pushbutton 24 for switching on the operating mode "record, normal forward running" and the blocking component 49 of the servomechanism 29 associated with the pushbutton 23 for switching on the operating mode "playback, normal forward running", via which coupling arrangement, upon actuation of the pushbutton 24 for switching on the operating mode "record, normal forward running", the blocking component 49 of the servomechanism 29 associated with the pushbutton 23 for switching on the operating mode "playback, normal forward running" can be displaced from its blocking position into its release position. The coupling arrangement 62 is here formed by an arm which is connected integrally to the blocking component 49 of the servomechanism 29 associated with the pushbutton 23 for switching on the operating mode "playback, normal forward running", projects from said blocking component, is angled off twice, is mounted by its central portion 63 so as to be pivotable about a pivoting axis 64 in line with the pivoting axis 55 of the pushbutton 24 and whose free pin-shaped end 65 can be displaced by the pushbutton 24 for switching on the operating mode "record, normal forward running". The free pin shaped end 65 of the arm forming the coupling arrangement 62 here protrudes into the displacement path of the blocking component 49' of the servomechanism 29' associated with the pushbutton 24 for switching on the operating mode "record, normal forward running". In this way, when the pushbutton 24 for switching on the operating mode "record, normal forward running" is actuated, the free end 65 of the arm 62 is displaced by the blocking component 49' of the servomechanism 29'. The arm 62 is acted upon by a spring 66 which via the arm 62 holds the blocking component 49 connected integrally to the latter against the pin 54 projecting from the arm 53 of the pushbutton 23.

The two pushbuttons 23 and 24 each have a retention arm 67, 67' which is connected integrally to them and in each case protrudes into the displacement path of the slides 46, 46'. When the slides 46, 46' are held in their switch-on position by the locking rail (not shown), said slides hold the retention arms 67, 67' in the positions illustrated in FIGS. 2 and 3 by dash-dotted lines, so that the pushbuttons 23 and 24 are accordingly also held in a displaced position, a user thereby being able to see that the relevant operating mode is switched on in the apparatus.

The pushbutton 24 for switching on the operating mode "record, normal forward running" furthermore has a feeler arm 68 connected integrally to it. This feeler arm 68 strikes against the slide 46' right at the beginning of an actuation of the pushbutton 24. If this slide 46' is blocked against displacement by a record-locking device, which is controlled in known manner by a record-locking indicator on a cassette inserted into the apparatus, then the feeler arm 68 is also blocked against pivoting by the slide 46', with the result that the pushbutton 24 for switching on the operating mode "record, normal forward running" cannot be pivoted any further and hence no triggering procedure of a servomechanism occurs at all.

Each of the two pushbuttons 23 and 24 can be pivoted counter to the action of a restoring spring 69, 69' designed as a compression spring. The restoring springs 69, 69' are supported on the one hand on a web 70, 70' of the pushbuttons 23, 24 and on the other hand on a tab 71, 71' projecting from the chassis 36. In their rest positions, the pushbuttons 23, 24 are supported from the inside on the housing 73 of the apparatus 1 by strips 72, 72' projecting from them under the action of the restoring springs 69, 69' acting on them.

The mode of operation of the servomechanisms 29, 29' described above is explained below.

When the pushbutton 23 for switching on the operating mode "playback, normal forward running" is actuated, being pivoted about its pivoting axis 51 counter to the restoring spring 69 acting on it, an electrical switch (not shown) via which the motor for driving the belt pulley 30 is switched on is closed via the retention arm 67 of the pushbutton 23 right at the beginning of the displacement of the latter. Thereupon, via the belt pulley 30, the shaft 31, the worm 35 and the worm wheel 37, the gear 39 is then driven by this motor. Upon actuation of the pushbutton 23, the arm 53 of the latter is also pivoted with it. In the process, the pin 54 on the arm 53 takes the blocking component 49 along with it, the latter being pivoted in the clockwise direction according to FIG. 2 into its release position, which is designated in FIG. 2 by the reference numeral 49a. After the release position has been reached, the leg spring 61 rotates the gear 40 in the clockwise direction via the releasing cam 60, the gear 40 coming into engagement with the motor-driven gear 39. After this, the gear 40 is motor-driven in the clockwise direction via the gear 39. During this procedure, the displacement plate 44 is rotated with it and displaces the slide 46 in the direction of the arrow 14, the carrier plate 15 then being displaced and consequently, as already explained, the apparatus components required for the operating mode "playback, normal forward running" being displaced. In this way, the operating mode "playback, normal forward running" is switched on in the apparatus. If the pushbutton 23 continues to be held actuated, then after almost one complete rotation of the gear 40 the blocking stop 57 strikes against the angled end 52 of the blocking lever 49, whereby the gear 40, which has in the meantime come out of engagement with the gear 39 again and has been rotated further in the clockwise direction by the leg spring 61 via the releasing cam 60, is then halted. If the pushbutton 23 is then released, it is pivoted back by the restoring spring 69 until the retention arm 67 strikes against the slide 46 held by the locking rail (not shown) and is held by the latter, the blocking lever 49 then occupying its working position indicated by 49b in FIG. 2 in which, via the blocking stop 56, its free end 52 blocks a rotation of the gear 40 under the action of the leg spring 61 acting on the releasing cam 60.

When the pushbutton 24 for switching on the operating mode "record, normal forward running" is actuated, the motor (not shown) for driving the belt pulley 30 is switched on via the retention arm 67' on the pushbutton 24 and the blocking lever 49, connected integrally to the pushbutton 24 is pivoted into its release position 49a'. However, during this procedure the arm 62, and by means of the arm 62 also the blocking lever 49, is pivoted into its release position by the blocking lever 49' via the free pin-shaped end 65 of the arm 62. Thus, in this way, upon actuation of the pushbutton 24 for switching on the operating mode "record, normal forward running" both blocking levers 49, 49' are pivoted into their release position and accordingly both servomechanisms 29, 29' are set in motion, whereupon the two slides 46, 46' are displaced via the displacement plates 44, 44'. Slide 46 here displaces the carrier plate 15 and slide 46' merely displaces the switching slide 22 of the recording switch 21 in the direction of the arrow 14.

Thus, in the case of the present apparatus, by between the pushbutton for switching on the operating virtue of the provision of the coupling arrangement mode "record, normal forward running" and the blocking component of the servomechanism associated with the pushbutton for switching on the operating mode "playback, normal forward running" both servomechanisms, one of which is associated with the pushbutton for switching on the operating mode "playback, normal forward running" and the other is associated with the pushbutton for switching on the operating mode "record, normal forward running", are triggered upon actuation of the pushbutton for switching on the operating mode "record, normal forward running". In this way, it is achieved that the apparatus components required for the operating mode "record, normal forward running" are displaced by two servomechanisms, particularly simple displacement arrangements, namely two simple slides, being found to be sufficient between the two servomechanisms and the apparatus components to be displaced by them. Here only small forces need be transmitted by the slide which is displaced during this procedure by the servomechanism associated with the pushbutton for switching on the operating mode "record, normal forward running", so that this slide can be weakly dimensioned. Such simple slides are also advantageous in that they take up little room. Since the coupling arrangement is designed as an arm connected integrally to the blocking component of the servomechanism associated with the pushbutton for switching on the operating mode "playback, normal forward running", a particularly simple and space-saving design is obtained for this coupling arrangement. Since the arm forming the coupling arrangement is displaced by the blocking component of the servomechanism associated with the button for switching on the operating mode "record, normal forward running", its displacement and consequently the displacement of the blocking component, connected integrally to it, of the servomechanism associated with the button for switching on the operating mode "playback, normal forward running" takes place only when the blocking component of the servomechanism associated with the button for switching on the operating mode "record, normal forward running" is in fact displaced, and this is advantageous with regard to a reliable triggering of the two servomechanisms.

The apparatus described here is a recording and reproducing apparatus for a magnetic tape for recording and reproducing audio signals. The measures according to the invention can also advantageously be employed in the case of recording and reproducing apparatuses for magnetic tapes for recording and reproducing video signals, so-called video recorders, and also in the case of recording and reproducing apparatuses for other record carriers, for example plate-shaped record carriers, for recording and reproducing audio signals and/or video signals.

I claim:

1. Recording and reproducing apparatus (1) for a drivable record carrier having a button for switching on an operating mode "playback, normal forward running" and having a button for switching on an operating mode "record, normal forward running" and having two servomechanisms which are each associated with one of the two buttons, are provided for carrying out the switching on of the operating modes and each have a motor-drivable driving component, a driven component which can be brought into engagement with the driving component for the purpose of displacing at least one apparatus component and a blocking component which can be displaced upon actuation of the relevant button respectively from a blocking position into a release position and, in its blocking position, holds the driven component out of engagement with the driving component and, in its release position, releases the driven component for bringing into engagement with the driving component, for carrying out the switching on of the operating mode "playback, normal forward running" at least one apparatus component, required for this operating mode being displaced and for carrying out the switching on of the operating mode "record, normal forward running" the apparatus component required for the operating mode "playback, normal forward running" and additionally at least one further apparatus component required for the operating mode "record, normal forward running" being displaced, characterized in that a coupling arrangement, via which, upon actuation of the button for switching on the operating mode "record, normal forward running", the blocking component of the servomechanism associated with the button for switching on the operating mode "playback, normal forward running" can be displaced from its blocking position into its release position, is provided between the button for switching on the operating mode "record, normal forward running" and the blocking component of the servomechanism associated with the button for switching on the operating mode "playback, normal forward running".

2. Apparatus according to claim 1, characterized in that the coupling arrangement is formed by an arm which is connected integrally to the blocking component of the servomechanism associated with the button for switching on the operating mode "playback, normal forward running", which projects from said servomechanism and the free end of which can be displaced by the button for switching on the operating mode "record, normal forward running" (FIGS. 2,3,4).

3. Apparatus according to claim 2, characterized in that the free end of the arm forming the coupling arrangement (62) protrudes into the displacement path of the blocking component of the servomechanism associated with the button for switching on the operating mode "record, normal forward running" and is displaced by this blocking component when this button is actuated (FIGS. 2,3,4).

* * * * *